Patented Sept. 15, 1936

2,054,742

UNITED STATES PATENT OFFICE 2,054,742

PREPARATION FOR THE TEETH AND THE MOUTH

Eberhard Elbel, Duesseldorf, Germany, assignor, by mesne assignments, to International Scientific Products Co., Chicago, Ill., a corporation of Illinois No Drawing. Application June 11, 1932, Serial No. 616,762. In Germany September 3, 1931

19 Claims. (Cl. 167—93)

Dentrifices, tooth washes, mouth washes and similar preparations for the teeth and the mouth frequently contain soap or other lathering wetting agents, such as saponines, salts of sulfonated castor oil, naphthalene sulfonic acids which are alkylated in the nucleus and the like. These additions, however, impart a disagreeable taste to the preparations and it is therefore difficult and often even impossible to use sufficient amounts of same to produce sufficient quantities of lather. Water-soluble albuminous substances or the decomposition products of high molecular weight of such substances are unobjectionable as to taste and physiological effects but decompose easily. It is therefore necessary to add very large quantities of same in order to bring the lather-forming property of the same into effect.

According to the present invention the above named drawbacks are avoided by adding to preparations for the teeth and the mouth, during manufacture of the same, lather-forming wetting agents consisting of sulphuric acid esters of higher aliphatic alcohols or salts of these esters. The sulphuric acid esters of lauryl and myristyl alcohols, the alcohol mixtures obtained by the reduction of cocoanut oil fatty acids and the salts of such esters are particularly advantageous, said substances having a very high lathering power and purifying effect.

The novel preparations for the teeth and the mouth may be produced in solid, liquid or paste-like form. As to taste the novel preparations when pure are tasteless and, on account of their extraordinarily high lathering power, the preparations are much more economical in use than the hitherto known lathering substances. If necessary, organic acids, particularly tartar-dissolving organic acids, and, if desired, hydrogen peroxide or similar percompounds may be added without reducing the durability and without impairing the lathering power and the purifying effect through the acid reaction since the sulphuric acid esters of the higher aliphatic alcohols are stable toward acids and alkalis and may be used in conjunction therewith.

Example 1

28 parts of carrageen mucilage (1:19) and 35 parts of highly refined glycerin are mixed while being simultaneously heated to about 80° C. In this mixture 7 parts of pure sodium salt of the sulphuric acid ester of lauryl alcohol are dissolved, whereupon 30 parts of light, precipitated calcium carbonate are slowly added under continuous stirring and the mass is cooled. Before the product is filled into tubes or other containers peppermint oil and menthol are added in the usual manner. In this way a neutral tooth paste of excellent properties is obtained.

Example 2

27 parts of carrageen mucilage (1:19) are mixed with 35 parts of highly refined glycerin 7 parts of pure sodium salt of the sulphuric acid ester of myristyl alcohol in the manner described in Example 1. In this mixture 1 part of tartaric acid or citric acid is dissolved and to the resulting mass 30 parts of very finely elutriated kaolin (bolus alba) are added under continuous stirring. After the product has cooled lemon oil may be added.

Example 3

25 parts of carrageen mucilage (1:19) are mixed with 30 parts of highly refined glycerin, 10 parts of sodium salts of the sulphuric acid esters of the alcohols which are obtained by the reduction of cocoanut oil fatty acids and 1 part of tartaric acid in the manner set forth in Example 2. Thereupon 3, 5 parts of hydrogen peroxide of 30% and finally by degrees 30 parts of kaolin (bolus alba) and the desired flavoring substances are added to the mass and mixed with the same by stirring.

Purification of the salts of the sulphuric acid esters of the higher aliphatic alcohols is often necessary to remove disagreeable tasting impurities therefrom, and the word "pure" is used in the above examples to indicate a material which is free from disagreeable tasting impurities.

The novel preparations may, as already mentioned, be produced in solid, liquid or paste-like form and may be used as tooth powder, tooth paste, tooth wash, mouth wash or gargle. The filler substances, aromatic admixtures and the like, which together with the claimed substances form the constituents of the finished preparations, may be of any desired suitable kind.

I claim:—

1. A preparation for the teeth and the mouth consisting in part of sulphuric acid esters of higher aliphatic alcohols.

2. A preparation for the teeth and the mouth, consisting in part of sulphuric acid esters of higher aliphatic alcohols, and organic acids.

3. A preparation for the teeth and the mouth, consisting in part of soluble salts of a pure sulphuric acid ester of higher aliphatic alcohols.

4. A preparation for the teeth and the mouth consisting in part of soluble salts of sulphuric acid esters of the mixtures of higher aliphatic alcohols obtained by the reduction of cocoanut oil fatty acids.

5. A preparation for the teeth and the mouth consisting in part of a soluble salt of a pure sulphuric acid ester of lauryl alcohol.

6. A preparation for the teeth and the mouth consisting in part of a soluble salt of sulphuric acid ester of myristyl alcohol.

7. A preparation for the teeth and the mouth consisting in part of soluble salts of sulphuric acid esters of higher aliphatic alcohols, and organic acids.

8. A preparation for the teeth and the mouth consisting in part of soluble salts of sulphuric acid esters of the mixtures of higher aliphatic alcohols obtained by the reduction of cocoanut oil fatty acids, and organic acids.

9. A preparation for the teeth and the mouth consisting in part of a soluble salt of sulphuric acid ester of lauryl alcohol, and organic acids.

10. A preparation for the teeth and the mouth consisting in part of a soluble salt of sulphuric acid ester of myristyl alcohol, and organic acids.

11. A lathering dentifrice, consisting in part of sulphuric acid esters of higher aliphatic alcohols, organic acids, and a substance adapted to split off oxygen.

12. A lathering dentifrice, consisting in part of salts of sulphuric acid esters of higher aliphatic alcohols, organic acids and a substance adapted to split off oxygen.

13. A lathering dentifrice, consisting in part of soluble salts of sulphuric acid esters of the mixtures of higher aliphatic alcohols obtained by the reduction of cocoanut oil fatty acids, organic acids and a substance adapted to split off oxygen.

14. A lathering dentifrice, consisting in part of a soluble salt of sulphuric acid ester of lauryl alcohol, organic acids and a substance adapted to split off oxygen.

15. A lathering dentifrice, consisting in part of a soluble salt of sulphuric acid ester of myristyl alcohol, organic acids and a substance adapted to split off oxygen.

16. A lathering dentifrice consisting in part of carrageen mucilage, glycerine and the sodium salt of the sulfuric acid ester of an aliphatic alcohol having approximately 12 to 14 carbon atoms in the molecule.

17. A lathering dentifrice capable of removing tartar from the teeth consisting in part of carrageen mucilage, glycerine, an organic acid capable of dissolving tartar to permit removal thereof from the teeth and the sodium salt of the sulfuric acid ester of an aliphatic alcohol having approximately 12 to 14 carbon atoms in the molecule.

18. A lathering dentifrice capable of removing tartar from the teeth consisting in part of carrageen mucilage, glycerine, an organic acid capable of dissolving tartar to permit removal thereof from the teeth, hydrogen peroxide and the sodium salt of the sulfuric acid ester of an aliphatic alcohol having approximately 12 to 14 carbon atoms in the molecule.

19. A dentifrice containing a soluble salt of a sulfuric acid ester of a higher aliphatic alcohol.

EBERHARD ELBEL.